US012708497B2

(12) United States Patent
Lichtensteiger

(10) Patent No.: US 12,708,497 B2
(45) Date of Patent: Aug. 18, 2026

(54) SALIVA SUCTION DEVICE

(71) Applicant: Ivoclar Vivadent AG, Schaan (LI)

(72) Inventor: Markus Lichtensteiger, Montlingen (CH)

(73) Assignee: Ivoclar Vivadent AG, Schaan (LI)

( * ) Notice: Subject to any disclaimer, the term of this patent is extended or adjusted under 35 U.S.C. 154(b) by 441 days.

(21) Appl. No.: 18/326,286

(22) Filed: May 31, 2023

(65) Prior Publication Data

US 2023/0390039 A1 Dec. 7, 2023

(30) Foreign Application Priority Data

Jun. 1, 2022 (EP) .................................... 22176849

(51) Int. Cl.
*A61C 17/10* (2006.01)
*A61C 17/08* (2006.01)

(52) U.S. Cl.
CPC .............. *A61C 17/10* (2019.05); *A61C 17/08* (2019.05)

(58) Field of Classification Search
CPC ........... A61M 1/86; A61M 1/87; A61C 1/052; A61C 17/13; A61C 17/096; A61C 17/092; A61C 17/09; A61C 17/12; A61C 17/08; A61C 17/065; A61C 17/06; A61C 17/04
USPC ............................................................ 433/93
See application file for complete search history.

(56) References Cited

U.S. PATENT DOCUMENTS 2,595,666 A * 5/1952 Hutson .................. A61C 17/08 433/96
2,603,870 A * 7/1952 Elling .................... A61C 17/08 433/93
2,637,106 A * 5/1953 Otis ....................... A61C 17/08 433/91
2,830,371 A * 4/1958 Dahl ...................... A61B 13/00 433/93
2,937,445 A * 5/1960 Erickson .................. A61B 1/24 433/93
3,864,831 A * 2/1975 Drake .................... A61C 17/08 433/91

(Continued)

FOREIGN PATENT DOCUMENTS

CH 704855 A2 10/2012
SE 415859 B * 11/1980

OTHER PUBLICATIONS

Orsing John Harry, "SE_415859_B_I translated" (Year: 1980).*

*Primary Examiner* — Edelmira Bosques
*Assistant Examiner* — Holly T. To
(74) *Attorney, Agent, or Firm* — Ann M. Knab; Thad McMurray

(57) ABSTRACT

A saliva suction device is provided comprising a plastic injection-molded part which configures a coupling for connection to a suction hose, possibly via an adapter, and is plugged on the suction hose or connected to the suction hose in another manner and particularly configures a lingual shield. A first suction channel extends through the molded part. A massive, i.e. non-porous, soft body is plugged on or at the plastic molded part and connected to the molded part in a form-fitting manner, through which soft body a second suction channel extends which is vertically offset relative to the first suction channel. Particularly on the side of the second suction channel, which is opposite the first suction channel, a suction area with at least one suction opening for saliva is configured in the soft body.

25 Claims, 2 Drawing Sheets

(56) References Cited

U.S. PATENT DOCUMENTS 3,883,074 A * 5/1975 Lambert ............. A61M 3/0275 601/160
4,017,975 A * 4/1977 Johnson ................. A61C 17/08 433/91
4,167,814 A * 9/1979 Schubert ................ A61C 17/08 433/93
4,906,188 A * 3/1990 Moseley ................ A61C 17/08 433/93
5,078,602 A * 1/1992 Honoshofsky ......... A61C 17/08 433/91
5,230,626 A * 7/1993 Larson ................... A61C 17/08 433/136
D360,685 S * 7/1995 Olsson ......................... D24/176
5,489,276 A * 2/1996 Jamshidi ................ A61C 17/08 604/268
5,490,780 A * 2/1996 Riewenherm .......... A61C 17/08 433/93
5,741,134 A * 4/1998 Davis ..................... A61C 17/08 433/91
5,890,899 A * 4/1999 Sclafani ................. A61C 17/08 433/140
6,213,772 B1 * 4/2001 Costello ................. A61C 17/08 433/140
10,905,534 B1 * 2/2021 Bodin .................... A46B 3/005
11,324,576 B2 * 5/2022 Asum .................... A61C 17/10
2003/0054317 A1 * 3/2003 Burney .................. A61C 17/08 433/91
2005/0014107 A1 * 1/2005 Culver ................... A61C 17/08 433/95
2006/0199147 A1 * 9/2006 Mahlmann ............. A61C 17/08 433/96
2010/0119989 A1 * 5/2010 Raybuck .................. A61C 5/90 264/16
2011/0151405 A1 * 6/2011 Dombrowski .......... A61M 1/84 433/96
2015/0064646 A1 * 3/2015 Bombin ................. A61C 17/00 433/91
2015/0164624 A1 * 6/2015 White .................... A61C 17/08 433/91
2017/0035538 A1 * 2/2017 Savic ................. A61C 13/1016
2017/0348055 A1 * 12/2017 Salcedo ............... A61C 9/0006
2018/0014920 A1 * 1/2018 Asum .................... A61B 13/00
2018/0049850 A1 * 2/2018 Gassler
2018/0193120 A1 * 7/2018 Asum .................. A61C 17/096
2020/0155284 A1 * 5/2020 Baker .................... A61C 17/08
2020/0352680 A1 * 11/2020 Nguyen ................... A61B 1/24
2021/0038354 A1 * 2/2021 Asum .................. A61C 17/092
2021/0085837 A1 * 3/2021 Fulton, III ............. A61B 1/015
2022/0040398 A1 * 2/2022 Grasso .................... A61M 1/85
2022/0168081 A1 * 6/2022 Javid ...................... A61C 17/08
2022/0202546 A1 * 6/2022 Tevrizian ............... A61C 17/08
2023/0023921 A1 * 1/2023 Zegarelli .............. A61C 19/066
2023/0106430 A1 * 4/2023 Lichtensteiger ..... A61C 17/092 433/93
2023/0337896 A1 * 10/2023 Ruhl .................. A61B 1/00094
2024/0416022 A1 * 12/2024 Prabhu .................. A61M 1/913

* cited by examiner

SALIVA SUCTION DEVICE

CROSS-REFERENCE TO RELATED APPLICATIONS

This application claims priority to European Patent Application No. 22176849.2 filed on Jun. 1, 2022, the disclosure of which is incorporated herein by reference in its entirety.

TECHNICAL FIELD

The invention relates to a saliva suction device.

BACKGROUND

Saliva suction devices have been known for a long time. They serve to remove saliva which has accumulated in the mouth of a patient and to allow the dentist to work in an undisturbed manner.

A suction hose serves this purpose. The suction hose can end under the tongue of the patient and suck in the saliva via its suction opening. Alternatively, the suction hose can also be equipped with a plastic molded part through which sucking is carried out.

If a plastic molded part is used, it can also be connected with or configure a tongue guard. The tongue guard serves to keep the tongue of the patient away from the place of treatment.

A solution of this type is known for instance from U.S. Pat. No. 4,906,188 A1, which is hereby incorporated by reference. There, the tongue guard comprises suction channels in its lower region which are to remove saliva. The lower region is connected integrally with the upper region, the actual tongue guard.

This solution has the following disadvantage: The tongue of a patient tends to move, or equally to "play". When the tongue of the patient moves the upper part of the tongue guard, the lower part of the tongue guard also moves along. However, the lower part rests in sensitive soft tissue below the tongue.

Thus, the mentioned solution is considered to be uncomfortable by the patients and acceptance thereof is low.

Furthermore, it has become known to pad the molded part with foam material. The foam material or sponge is open-pored to be able to provide the desired suction effect. The sponge makes the movement of the lower part more bearable as it is substantially more flexible and softer than the molded part.

However, in this solution the suction effect is slightly lower than in the solution according to the US patent document mentioned above. The reason for this is that in the upper part of the sponge much air is sucked in.

This is because the sponge is open-pored multi-directionally. This means that it is not possible with a sponge to only suck off the lower region purposefully, i.e. without the suction effect of the suction hose homogenizing through the sponge.

To ensure better suction in spite of the sponge, it has also been proposed to cover the upper part of the sponge surrounding the suction hose without further ado. This suggestion can slightly reduce false air but because of the multi-directional open porosity of the sponge false air still regularly enters the suction hose.

SUMMARY

In contrast, the invention is based on the task of providing a saliva suction device, which combines good comfort with good suction power.

This task is inventively solved by the claims. Advantageous developments may be taken from the subclaims.

According to the invention, the saliva suction device includes a plastic injection-molded part. The molded part has a coupling for connection to a suction hose, possibly via an adapter. It is plugged on the suction hose or connected to the suction hose in any other manner and forms in particular a lingual shield. A first suction channel extends through the molded part.

On the side opposite the coupling a massive, i.e. non-porous soft body is plugged on or at the plastic molded part. The soft body preferably consists of a soft plastic such as an elastomer. The soft body is preferably softer than the molded part. The soft body is connected to the molded part preferably in a form-fitting manner.

The soft body is non-porous, i.e., it does not have any pores, which would typically extend through a body in a stochastically distributed manner—as in the case of a sponge. Instead it is impermeable, except at places at which suction openings are configured deliberately.

If negative pressure is applied to the suction hose, it is transferred exclusively to the suction openings by the inventive saliva suction device. This prevents false air.

A second suction channel extends through the soft body according to the invention, said second suction channel being vertically offset relative to the first suction channel. This means that the suction channels substantially extend in the same direction but not coaxially but offset to one another in the direction transverse to their axes. Preferably, the second suction channel is further away from the lingual shield than the first suction channel.

The first suction channel extends preferably in extension of the coupling and thus the suction hose. It is considerably shorter than the second suction channel, e.g. having a length of 5 mm to 20 mm. The second suction channel has a length of e.g. 15 mm to 50 mm.

Preferably, a transition area is configured between the suction channels. It is configured as a hollow space which extends from the first to the second suction channel, with an orientation transverse to the axes of both suction channels and connecting both suction channels. The transition area preferably has a larger flow area than both the first and second suction channels. It is configured preferably at a location where the soft body is connected in a form-fitting manner with the molded part.

The flow area of the first suction channel is preferably larger than that of the suction hose, e.g. by 20% to 200%. The flow area of the section suction channel is also preferably larger than that of the suction hose, e.g. by 40% to 400%. The flow areas of both suction channels are preferably higher than wide and particularly preferably vertically oval.

The soft body and thus the second suction channel are preferably curved; preferably in such a way that the bottom of the soft body, i.e. the side facing away from the lingual shield, is convex and the upper side, i.e. the side adjacent to the lingual shield, is concave. This allows body-compatible snuggling of the soft body to the base of the tongue.

According to the invention, a suction area with at least one suction opening for saliva is configured in the soft body, in particular on the side of the second suction channel opposite the first suction channel, i.e. the bottom of the soft body. This suction opening serves to suck off saliva of the patient accumulating on the base of the tongue.

The at least one suction opening is configured preferably as a slit whose longitudinal extension extends transverse to the second suction channel across the entire bottom of the soft body, and only ends at the end of the lower third of the side wall of the soft body.

The slit not only allows suction with a large flow area—and thus low flow velocity at this place, too. In addition, resilience of the soft body against bending about an axis transverse to the extension of the second suction channel is considerably increased as the soft body is comprised of less material at this location due to the slit.

Preferably, a plurality of slits, e.g. 3 to 10 slits, particularly preferably 5 to 7 slits, is provided evenly distributed over the bottom of the soft body. Each slit has the described dual function of "material weakening" and "reduction of flow velocity." If the saliva suction device is inserted into the mouth of the patient e.g. in such a way that it is in contact with the alveolar ridge it bends towards the top without further ado at the contact area to the alveolar ridge such that the saliva suction device remains at the base of the tongue in spite of the tendency to move to the top favored in this way.

According to the invention it is favorable if the soft body is connected in a form-fitting manner with the molded part. The form-fitting connection ensures that the soft body does not accidentally come loose from the molded part in the mouth of the patient. Instead, it is also possible to attach the soft body to the molded part by bonding.

In a preferred embodiment of the soft body, ribs are provided on the bottom which extend between the slits, respectively. Just like the slits, the ribs extend perpendicularly to the second suction channel. They serve as a kind of spacer and prevent the adjacent suction opening from attaching by suction to the soft tissue as a result of the negative suction pressure, which would result in no further suction function.

Furthermore, in an advantageous embodiment, small suction openings are provided in extension of the slits, respectively. They serve to additionally suck off saliva when the soft body is in lateral contact with the alveolar ridge.

It is preferable that the saliva suction device includes a plastic injection-molded part configured with a coupling for connection to a suction hose, which plastic injection-molded part is plugged onto the suction hose or connected to the suction hose, the plastic injection-molded part having a suction channel extending through it, a lingual shield integral or part of the plastic injection molded part, a non-porous, soft body plugged on or at the plastic injection-molded part and connected to the injection-molded part in a form-fitting manner, through which non-porous, soft body a second suction channel extends which is vertically offset relative to the first suction channel, and wherein on a side of the second suction channel, which is opposite the first suction channel, a suction area with at least one suction opening for saliva is configured in the soft body.

It is preferable that the first axis of the first suction channel extends coaxially to the suction hose and the second axis of the second suction channel extends in an offset manner in the direction pointing away from the lingual shield, wherein the second axis may be curved.

It is preferable that the second suction channel comprises a longitudinal oval or egg-shaped cross-section, with a height which is more than twice the width.

It is preferable that the soft body is flexible at a modulus of elasticity of less than 1 GPa, in particular of less than 100 MPa, and has an average wall thickness larger than a wall thickness of the molded part.

It is preferable that the soft body is bent in a relaxed state and has a convex side and a concave side, the convex side on the bottom side and the concave side on the upper side, and wherein the suction openings or the plurality of suction openings are configured on the convex side.

It is preferable that the curved soft body comprises slits as suction openings on a convex side which extend transversely to the bending radius of the soft body and extend over the entire, or substantially entire, convex side of the soft body.

It is preferable that the curved soft body comprises slits as suction openings on a convex side which are closable by straightening the soft body.

It is preferable that the curved soft body on one side comprises slits as suction openings and in extension thereof a plurality of smaller suction openings or holes by way of contrast, and at least one arrangement of a slit and at least one of the adjacent smaller suction openings forms a predetermined breaking point.

It is preferable that the lingual shield extends along a concave upper side of the curved soft body and is spaced apart from the curved soft body by less than 8 mm, and includes a curved edge following the course of the curved soft body, and wherein the soft body protrudes beyond the lingual shield at a distal end.

It is preferable that the soft body is dimensionally stable with respect to the negative suction pressure of the saliva suction device, to between 80 mbar and 250 mbar.

It is preferable that the second suction channel forms a hollow chamber closed on all sides except for the suction openings and an outlet opening toward the molded part, which is under negative pressure when the saliva suction device is operated.

It is preferable that the first and/or second suction channel has a larger cross-section than the suction hose, and a cross-section which is enlarged compared to a circular cross-section toward the lingual shield.

It is preferable that the lingual shield extends in extension of a vertically oval or elliptical cross-section of the second suction channel.

It is preferable that the second suction channel comprises a substantially constant cross-section over a longitudinal extension up to an outlet opening towards the molded part, the cross-section being larger than the free flow area of the suction hose.

It is preferable that the soft body comprises a profile structure with ribs or projections on a side opposite the lingual shield, with a substantially equal profile height over the course of the side.

It is preferable that the profile structure comprises a height of more than 0.2 mm, in particular approximately 0.5 mm, and the suction openings of the suction area end at the base of the profile structure such that if the profile structure comes into contact with tissue, the profile structure prevents the suction opening from being blocked by the tissue.

It is preferable that the molded part with the coupling is rotatable with respect to the suction hose and establishes an adjustment of the cross-sections of the suction hose and the second suction channel.

It is preferable that the suction hose comprises an integrated wire receiving device for receiving a plastically deformable wire which ends at the molded part for connecting the wire therewith.

It is preferable that the soft body comprises at least one suction opening in the form of a slit, on an upper side adjacent to the lingual shield.

It is preferable that the lingual shield comprises a film hinge for configuring a joint with a joint axis along a longitudinal extension of the lingual shield.

It is preferable that the soft body can be separated from the molded part and replaced, and wherein the combination of suction hose and molded part is autoclavable.

It is preferable that the plastic injection-molded part is coupled to the suction hose via an adapter.

It is preferable that the soft body is flexible at a modulus of elasticity of less than 100 MPa, and has an average wall thickness larger than a wall thickness of the molded part.

It is preferable that the soft body has a degree of hardness between 5 and 75 Shore A.

It is preferable that the plastic injection-molded part has a degree of hardness between 40 and 80 Shore D.

BRIEF DESCRIPTION OF THE DRAWINGS

Further details, advantages and features of the invention may be taken from the following description of an exemplary embodiment of the invention in conjunction with the drawings, in which.

DETAILED DESCRIPTION

Figure 1:
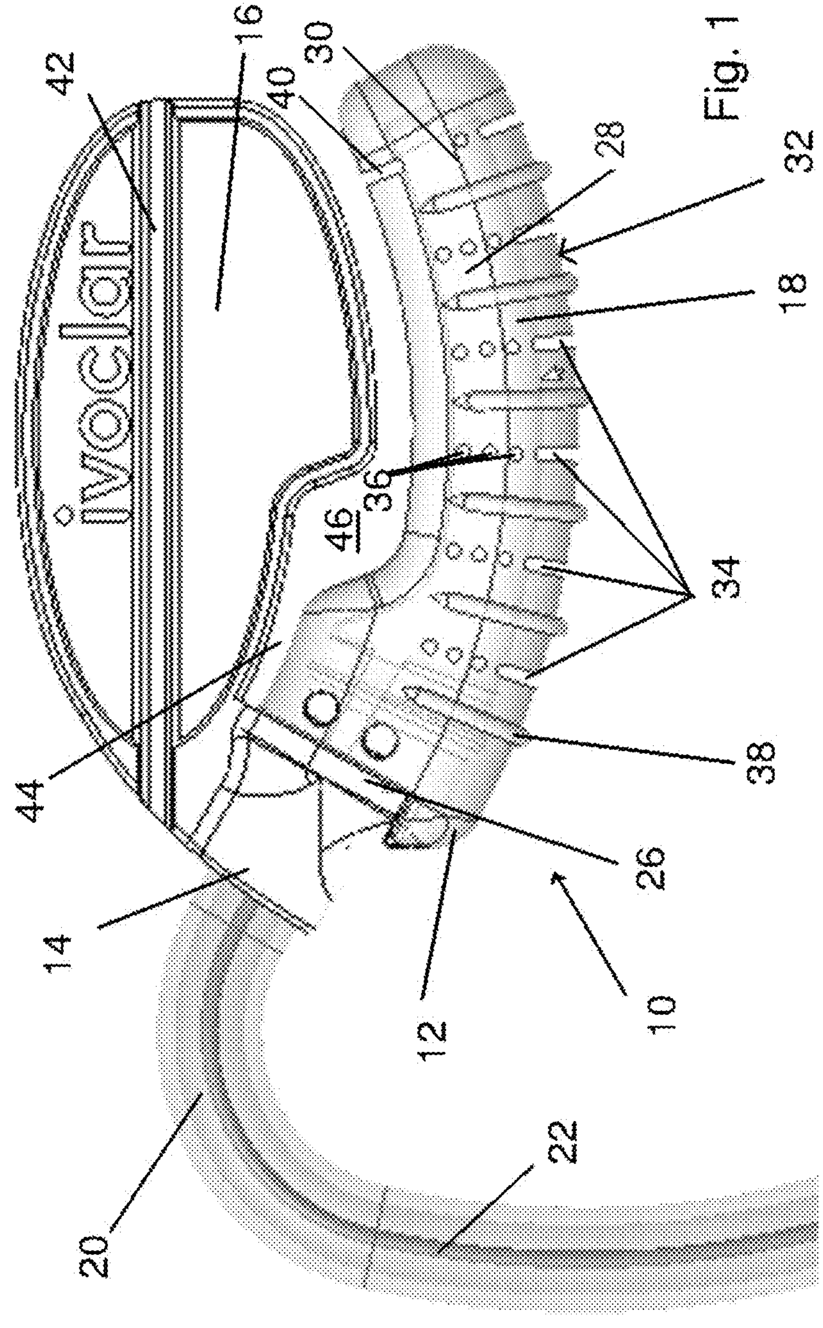
FIG. 1 shows a side view of an embodiment of an inventive saliva suction device.
Figure 2:
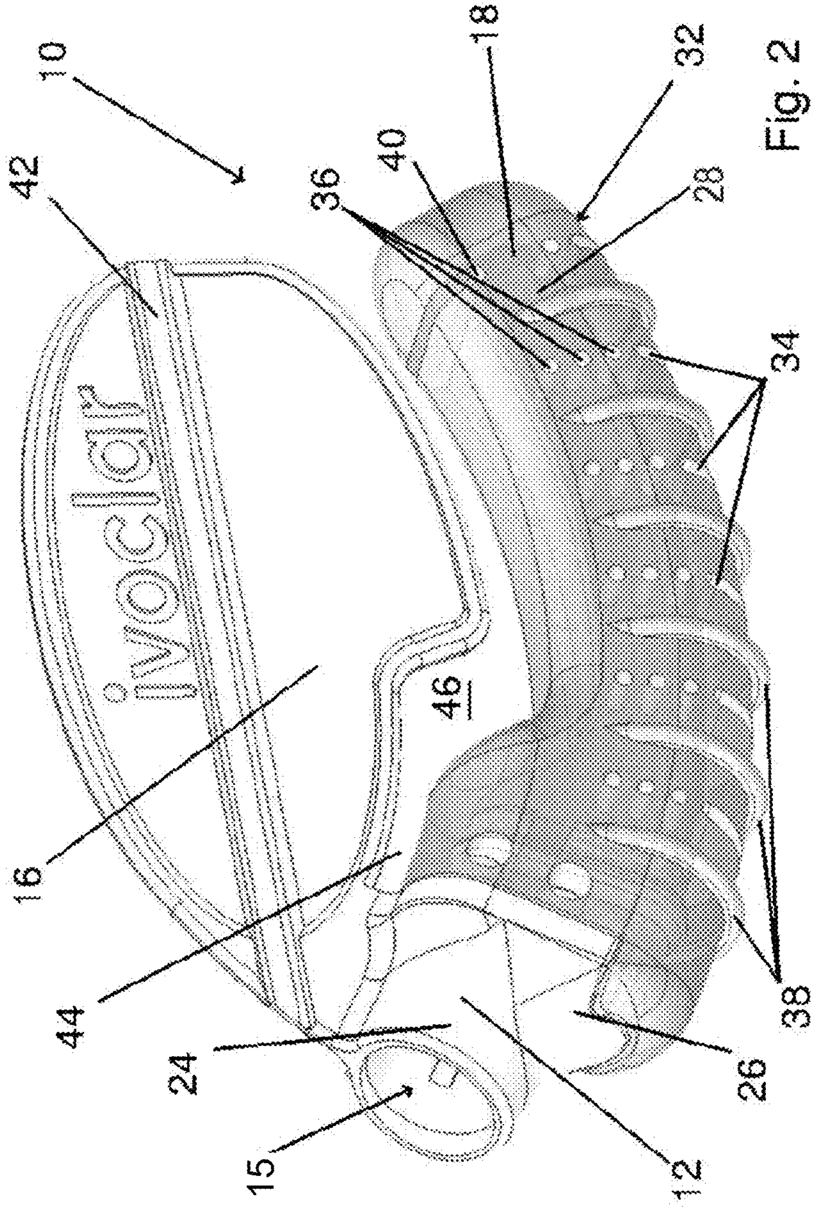
FIG. 2 shows the embodiment according to FIG. 1, but in a perspective view.

In FIGS. 1 and 2, an inventive saliva suction device 10 is illustrated, respectively. In both Figures, the same reference signs are used. The saliva suction device 10 consists of a plastic molded part 12, to which a coupling 14 also belongs, a lingual shield 16 and a soft body 18. The coupling 14 is intended to be connected to a suction hose 20. The suction hose 20 can be plugged into the coupling 14, and firmly connected therewith after plugging. Preferably, a plastically deformable wire 22 extends in the suction hose. The wire can either end loosely in or at the molded part 12 or can be plugged therein and anchored there. In a way known per se, the wire 22 serves to reinforce the suction hose 20.

The lingual shield 16 and the molded part 12 are configured integrally with one another. They consist of plastic and are preferably produced by injection-molding.

A first suction channel 24 is configured in the molded part 12 in the extension of the coupling 14. In this respect, the suction channel 24 extends substantially along the longitudinal extension of the lingual shield 16.

Towards the side opposite the coupling 14, the first suction channel 24 is extended, namely to the bottom, i.e. to the side facing away from the lingual shield 16. There, the molded part 12 forms a transition area 26 towards the soft body 18 and towards the second suction channel 28.

Both suction channels extend parallel to one another in the transition area 26, but vertically offset, namely in such a way that the second suction channel 28 is further away from the lingual shield 16 than the first suction channel 24. In the further course, the soft body 18 and thus the second suction channel 28 is bent around a bending radius which extends towards the top in the illustration according to FIG. 1 and ends above the lingual shield 16.

This means that an axis 30 of the second suction channel extends in a curved or bent manner, namely starting from the transition area 26 curved towards the top, with regard to a straight course of the axis.

At a bottom 32 of the soft body 18, i.e. the side opposite the lingual shield 16, a plurality of slits 34 is configured in the soft body 18. The slits extend over the entire bottom of the soft body 18 and also into the side wall of the soft body 18.

In the exemplary embodiment illustrated herein, the slits have a width of 0.5 mm and a length of 10 mm, measured along the outside of the soft body. The soft body 18 is bidirectionally convex at its bottom 32. It is also bent with a radius of curvature whose axis extends along the axis 30. Thus, the radius of curvature is considerably smaller than the bending radius described above.

A plurality of small suction openings 36 is additionally provided in the extension of the slits 34. In the exemplary embodiment illustrated, three small suction openings 36 each are configured in every side wall of the soft body 18. The small suction openings 36 also have a diameter of approximately 0.5 mm.

On the bottom 32 of the soft body 18, ribs 38 extend out of the underside 32 parallel to the slits 34. They terminate at the side wall of the soft body 18, approximately at the height at which the small suction openings 36 also end. Thus, both these and the slits 34 are prevented from abutting soft tissue, so that there is no fear of self-sealing.

The slits 34 and the ribs 38 extend parallel to one another, each, namely in a uniform grid pattern. In the exemplary embodiment illustrated, on the bottom 32 six slits 34 and six ribs 38 are configured. It is to be understood that this number is adjustable to the requirements to a large extent in every case.

The soft body 18 is closed on its side opposite the molded part 12. Here, it forms a distal end. At the distal end, an additional slit 40 is configured on the upper side of the soft body 18, said additional slit 40 having a special function.

The additional slit 40 starts to function when the patient is lowered into an intensive supine position in the dentist's chair. In this position, the distal end of the soft body 18 is the lowest part in the mouth of the patient. Collecting saliva is then to be sucked off by the additional slit 40.

Additionally, the slit 40 is exactly opposite the slit 34 which is closest to the distal end. Both slits extend considerably into the side walls of the soft body 18. Material weakening is most severe at this point. Thus, if the dentist considers it useful, the distal end of the soft body can be detached without further ado, e.g., by means of scissors, a knife or simply using one's hand. Then, the soft body 18 has an open end which may also serve as a suction opening even when the patient is in the supine position.

It is also particularly favorable that the inventive soft body 18 can be separated as desired by the arrangement of the slits. For instance, separation can be carried out at the slit 34 third from last to provide for a children's size of the inventive saliva suction device 10. Preferably, the lingual shield 16 is then shortened in the same manner, for which purpose a predetermined breaking point—not illustrated in the Figures—may also be configured.

It is particularly favorable that the lingual shield 16 forms a film hinge 42 over its entire length. The upper part of the lingual shield can be bent to the side slightly without further ado by the film hinge 42. In this way, the lingual shield 16 obtains an also slightly bent configuration and better adjusts to the bottom of the tongue of the patient.

The lingual shield is curved on its underside, in a manner that leaves a substantially uniformly wide slit 44 to the soft body 18. For example, the slit 44 may have a width of 2 to 3 mm. This prevents the tongue from entering the area between the tongue shield 16 and the soft body 18. The slot is widened approximately in the middle with a recess 46. Space is thus provided at this point when the soft body 18 is to be removed from the molded part 12 and replaced.

In an advantageous embodiment, at least the molded part 12 with the lingual shield 16 is autoclavable.

The second suction channel has a substantially constant cross-section over a longitudinal extension up to an outlet opening 15 towards the molded part.

The terms "about" and "substantially" are intended to include the degree of error or uncertainty associated with measurement of the particular quantity or shape as one of ordinary skill in the art would understand.

The invention claimed is:

1. A saliva suction device comprising
a plastic injection-molded part configured with a coupling for connection to a suction hose, the plastic injection-molded part configured to be plugged onto the suction hose or connected to the suction hose, the plastic injection-molded part having a first suction channel extending through it,
a lingual shield integral or part of the plastic injection molded part,
a non-porous, soft body plugged on or at the plastic injection-molded part and connected to the injection-molded part in a form-fitting manner, and having a second suction channel that is vertically offset relative to the first suction channel and which second suction channel is fabricated of a non-porous material,
wherein on a side of the second suction channel, which is opposite the first suction channel, a suction area with at least one suction opening for saliva is configured in the soft body,
wherein there is a recess between the lingual shield and the non-porous soft body,
wherein the lingual shield extends along a concave upper side of the curved soft body and is spaced apart from the curved soft body by less than 8 mm, and comprises a curved edge following the course of the curved soft body, and
wherein the soft body protrudes beyond the lingual shield at a distal end.

2. The saliva suction device as claimed in claim 1,
wherein a first axis of the first suction channel is configured to extend coaxially to the suction hose and
wherein a second axis of the second suction channel extends in an offset manner in the direction pointing away from the lingual shield,
wherein the second axis is either curved or not curved.

3. The saliva suction device as claimed in claim 1,
wherein the second suction channel comprises a longitudinal oval or egg-shaped cross-section, with a height which is more than twice a width.

4. The saliva suction device as claimed in claim 1,
wherein the soft body is flexible at a modulus of elasticity of less than 1 GPa, and has an average wall thickness larger than a wall thickness of the plastic injection-molded part.

5. The saliva suction device as claimed in claim 1,
wherein the soft body is bent in a relaxed state and has a convex side and a concave side, the convex side on the bottom side and the concave side on the upper side, and
wherein the at least one suction opening is configured on the convex side.

6. The saliva suction device as claimed in claim 1,
wherein the curved soft body comprises slits as suction openings on a convex side which extend transversely to the bending radius of the soft body and extend over the entire, or substantially entire, convex side of the soft body.

7. The saliva suction device as claimed in claim 1,
wherein the curved soft body comprises slits as suction openings on a convex side which are closable by straightening the soft body.

8. The saliva suction device as claimed in claim 1,
wherein the at least one suction opening in the soft body comprises a plurality of slits as suction openings and in extension thereof a plurality of smaller, in comparison to the size of the plurality of slits, suction openings or holes adjacent to each slit, and
wherein at least one arrangement of a slit and at least one of the adjacent smaller suction openings forms a predetermined breaking point.

9. The saliva suction device as claimed in claim 1,
wherein the soft body is dimensionally stable at a negative suction pressure of between 80 mbar and 250 mbar of the saliva suction device.

10. The saliva suction device as claimed in claim 1,
wherein the second suction channel forms a hollow chamber closed on all sides except for the suction openings and an outlet opening toward the injection-molded part, which is under negative pressure when the saliva suction device is operated.

11. The saliva suction device as claimed in claim 1,
wherein the first and/or second suction channel is configured to have a larger cross-section than the suction hose.

12. The saliva suction device as claimed in claim 1,
wherein the lingual shield extends in extension of a vertically oval or elliptical cross-section of the second suction channel.

13. The saliva suction device as claimed in claim 1,
wherein the second suction channel comprises a substantially constant cross-section over a longitudinal extension up to an outlet opening towards the plastic injected-molded part, said cross-section is configured to be larger than an area of the suction hose.

14. The saliva suction device as claimed in claim 1,
wherein the soft body comprises a profile structure with ribs or projections on a side opposite the lingual shield, with a substantially equal profile height over the course of the side.

15. The saliva suction device as claimed in claim 14,
wherein the ribs or projections on the profile structure comprises a height selected from more than 0.2 mm and approximately 0.5 mm, and
wherein the suction openings of the suction area end at the base of the profile structure such that if the profile structure comes into contact with tissue, the profile structure prevents the suction opening from being blocked by the tissue.

16. The saliva suction device as claimed in claim 1,
wherein the plastic injected-molded part with the coupling is rotatable with respect to the suction hose.

17. The saliva suction device as claimed in claim 1,
wherein the suction hose comprises an integrated wire receiving device for receiving a plastically deformable wire which ends at the plastic injection-molded part for connecting the wire therewith.

18. The saliva suction device as claimed in claim 1,
wherein the soft body comprises at least one suction opening in the form of a slit, on an upper side adjacent to the lingual shield.

19. The saliva suction device as claimed in claim 1,
wherein the lingual shield comprises a film hinge for configuring a joint with a joint axis along a longitudinal extension of the lingual shield.

20. The saliva suction device as claimed in claim 1, wherein the soft body can be separated from the plastic injection-molded part and replaced, and wherein the combination of suction hose and plastic injection-molded part is autoclavable.

21. The saliva suction device as claimed in claim 1, wherein the plastic injection-molded part is coupled to the suction hose via an adapter.

22. The saliva suction device as claimed in claim 1, wherein the soft body is flexible at a modulus of elasticity of less than 100 MPa, and has an average wall thickness larger than a wall thickness of the plastic injection-molded part.

23. The saliva suction device as claimed in claim 1, wherein the soft body has a degree of hardness between 5 and 75 Shore A.

24. The saliva suction device as claimed in claim 1, wherein the plastic injection-molded part has a degree of hardness between 40 and 80 Shore D.

25. A saliva suction device comprising a plastic injection-molded part configured with a coupling for connection to a suction hose, the plastic injection-molded part configured to be plugged onto the suction hose or connected to the suction hose, the plastic injection-molded part having a first suction channel extending through it, a lingual shield integral or part of the plastic injection molded part, a non-porous, soft body plugged on or at the plastic injection-molded part and connected to the injection-molded part in a form-fitting manner, and having a second suction channel that is vertically offset relative to the first suction channel and which second suction channel is fabricated of a non-porous material, wherein on a side of the second suction channel, which is opposite the first suction channel, a suction area with at least one suction opening for saliva is configured in the soft body, wherein there is a recess between the lingual shield and the non-porous soft body, wherein the at least one suction opening in the soft body comprises a plurality of slits as suction openings and a plurality of smaller, in comparison to the size of the slits, suction openings or holes adjacent to each slit, and wherein at least one arrangement of a slit and at least one of the adjacent smaller suction openings forms a predetermined breaking point.

* * * * *